United States Patent [19]

Broutin et al.

[11] Patent Number: 5,376,167
[45] Date of Patent: Dec. 27, 1994

[54] PURIFYING DEVICE FOR HYDROGEN COMPRISING A BASE MADE OF AN ALLOY OF THE SAME COMPOSITION AS THAT OF THE TUBES

[75] Inventors: Paul Broutin, Ecully; André Buisson, Tassin-la-Demi-Lune; Philippe Legoit, Bondy, all of France

[73] Assignee: Institut Francais du Petrole, Rueil-Malmaison, France

[21] Appl. No.: 78,092

[22] Filed: Jun. 18, 1993

[51] Int. Cl.$^5$ .................. B01D 53/22; B01D 71/02
[52] U.S. Cl. ............................................ 96/8; 96/10; 55/523; 95/56
[58] Field of Search .................. 95/55, 56; 96/4, 8, 96/10; 55/523

[56] References Cited

U.S. PATENT DOCUMENTS

| | | | |
|---|---|---|---|
| 2,911,057 | 11/1959 | Green et al. | 96/8 |
| 2,961,062 | 11/1960 | Hunter et al. | 55/16 |
| 3,245,206 | 4/1966 | Bonnet | 96/10 |
| 3,312,043 | 4/1967 | Sexton | 96/10 |
| 3,368,329 | 2/1968 | Eguchi et al. | 55/158 |
| 3,392,510 | 7/1968 | Koch, Jr. | 96/8 |
| 3,437,357 | 4/1969 | Rubin | 96/8 X |
| 3,509,694 | 5/1970 | Imai et al. | 55/16 |
| 3,981,696 | 9/1976 | Lalis et al. | 96/8 |
| 4,092,135 | 5/1978 | Dussaussoy et al. | 96/8 |
| 4,692,176 | 9/1987 | Israelson | 55/523 X |
| 4,904,287 | 2/1990 | Lippert et al. | 55/523 X |
| 5,037,461 | 8/1991 | Zievers et al. | 55/523 X |
| 5,205,841 | 4/1993 | Vaiman | 95/56 X |

FOREIGN PATENT DOCUMENTS

| | | | |
|---|---|---|---|
| 61-157323 | 7/1986 | Japan | 96/10 |
| 61-157324 | 7/1986 | Japan | 96/10 |
| 61-157327 | 7/1986 | Japan | 96/10 |
| 62-128903 | 6/1987 | Japan | 96/8 |
| 62-143801 | 6/1987 | Japan | 95/56 |
| 63-224714 | 9/1988 | Japan | 96/8 |

OTHER PUBLICATIONS

Derwent Publications Ltd., *World Patents Index Latest*, Abstract No. 86-141337 (abstract of JP-A-61077602).

*Primary Examiner*—Robert Spitzer
*Attorney, Agent, or Firm*—Millen, White, Zelano, & Branigan

[57] ABSTRACT

A device for separating hydrogen from gaseous mixtures containing it or for purifying gaseous hydrogen, comprising an outer casing (2) filled with a plurality of tubes (3) made of a suitable palladium based alloy, which tubes are closed at one end (4). The tubes are fixed in substantially seal-tight manner, at the open end side (5), to a part at least of a base (6) made of a metal alloy, the composition of which is such that its expansion coefficient in hydrogen is substantially equal to that of the alloy of the tubes. The base can be integrally formed and made of the above-mentioned alloy, or it can comprise a ring of substantially the same composition as that of the tubes adhering thereto by way of an autogenous soldering.

22 Claims, 1 Drawing Sheet

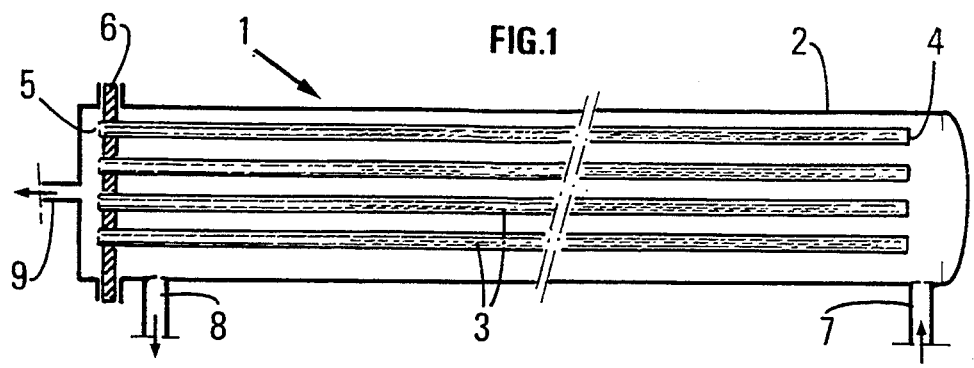
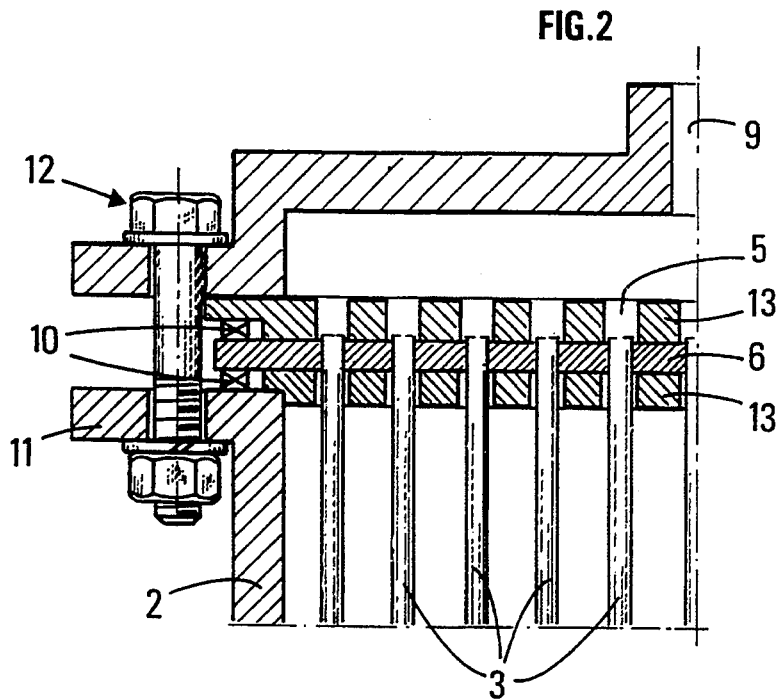
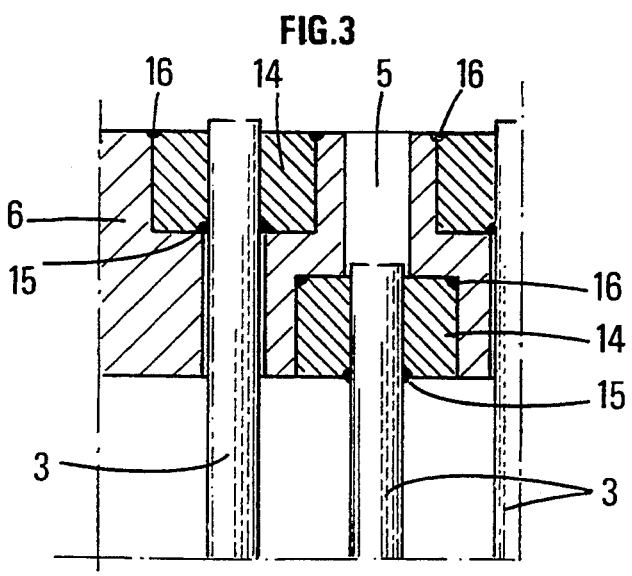

PURIFYING DEVICE FOR HYDROGEN COMPRISING A BASE MADE OF AN ALLOY OF THE SAME COMPOSITION AS THAT OF THE TUBES

BACKGROUND OF THE INVENTION

The present invention relates to a device for separating hydrogen in gaseous mixtures containing it or for purifying gaseous hydrogen.

The invention is used particularly within the electronics industry to obtain ultra pure hydrogen containing, for example, less than one part per million of parts (1 ppm) of other gases. It can be used in meteorology where sounding balloons are used which are swollen with hydrogen, in separating hydrogen produced by the reforming of methanol with steam or by electrolysis, in gas preparation with samples for analysis, in isotopic separations or in refining vegetable oils.

The prior art can be illustrated by the patents U.S. Pat. Nos. 2,961,062, 3,368,329, 3,509,694 and JP-A-61 077 602 (World Patent index AN 86-141 337 Derwent Publication Ltd—London, GB).

For low flowrates, usually 0.1 to 100 ($Nm^3/h$) normal cubic meters per hour, the purifying devices usually encountered industrially employ the principle of hydrogen permeating through a membrane of a palladium based alloy which is selectively permeable to hydrogen and which acts like a filter, allowing pure hydrogen to pass through it, but preventing gas impurities or other constituents of the gaseous mixture to pass through it.

During practical application of this process, the filter is usually arranged in the form of a tube which is open at one end, this tube or preferably a series of these tubes, being assembled in an outer casing made of stainless steel, or other material, which is inert to the action of the gas or of the gaseous mixture, so as to form a diffusion cell, the impure hydrogen or the gaseous mixture passing under pressure into the casing where it comes into contact with the outer surface of the tube or tubes, the pure hydrogen diffusing through the wall(s) to the inside of the tube, and then passing through the open end or the open ends of the tube or tubes to be collected outside the unit.

The tubes which are usually 50 to 200 micrometers in thickness, for example, are preferably assembled in parallel relationship on a punctured metal disc (or base) made of stainless steel or nickel, for example.

The assembly is realised by way of a brazing containing palladium and silver in such a way that substantially perfect sealing is obtained between the tubes and the punctured base. Usually, the alloy of the brazing has a very high silver content.

The temperature and pressure at which these tubes are used are respectively at least 200° C., for example 200° to 700° C. and 2 to 50 bar (1 bar=0.1 MPa). The combined effect of the temperature and the pressure difference existing between the inside and outside of the tubes can cause the tubes to become distorted and flattened which can be reduced by incorporating within the tubes at least one stiffening element such as a helicoidal spring which maintains the lateral rigidity of the tubes, whilst allowing the gas to pass through them (this technique is described, for example, in French Patent FR-B-1352751).

It is a known fact that the palladium based alloy which contains silver expands by quite a significant value (about 3% linear), irrespective of its composition in the presence of hydrogen. Moreover, only the palladium-silver alloys containing 74 to 79% silver are not subject to a phase change ($\alpha$ into $\beta$ or $\beta$ into $\alpha$) in the presence of hydrogen, such a change being accompanied by fritting of the alloy and the appearance of cracks which brings about leakage.

It is noted that the useful life of purifying devices, for example palladium-silver-based ones, which are currently in use commercially is limited by the number of cycles to which they are subjected which comprise frequent operating and stoppage phases. The reasons for this are as follows:

the tubes which may be made of a palladium-silver alloy, and which expand by 3% in hydrogen, are clamped due to their being fixed in the hole of the base where they are located and thus cannot expand freely. They are therefore subject to cold-hammering and significant fatigue;

the alloy of the brazing which is of a very different composition from that of the tube diffuses, during manufacture of the cell, into the tube and thus modifies the composition of the alloy of the tube to a certain extent so that where this happens the desired percentage of silver is no longer present which enables phase changes to be avoided when the hydrogen is being absorbed.

This brings about fritting, a deterioration in the physical properties of the alloy and the start of cracks.

SUMMARY OF THE INVENTION

The aim of the present invention is to overcome these drawbacks, and therefore to produce purifying devices which are much more reliable and which are capable of a large number of cycles without deteriorating.

To be more exact, the invention relates to a device for separating hydrogen in gaseous mixtures containing it or for purifying gaseous hydrogen, comprising an outer casing (2) enclosing at least one tube (3) and preferably a plurality of tubes (3) made of an appropriate palladium based alloy, characterised in that at least one of the ends of the tube(s) (3) is/are fixed in substantially seal-tight manner to a part at least of a base (6) made of a metal alloy, preferably palladium based, the composition of which is such that its expansion coefficient in hydrogen is substantially equal to that of the alloy of the tube.

According to a first embodiment of the device, the base can be made up of one single part which is substantially identical in composition to that of the alloy used to form the tubes, said tubes adhering to said base in substantially seal-tight manner, preferably by autogenous soldering, for example, by laser beam, or plasma micro-blowpipe or electric blowpipe, or by a suitable glue which is resistant to the temperature, medium and pressure employed, such as polyimide glues marketed under the trade name SYNTHORG-IP605 by CEMOTA in Solaize (FRANCE).

The base can be fixed to the casing in substantially seal-tight manner by at least one clamp which grips at least one joint of suitable composition, These joints must actually be resistant to temperatures of 500° C. in reducing atmosphere, allow lateral sliding of the base from 1 to 10% of its radius, for example from 0.1 to 5 mm in the case of a base of radius 15 mm, and be of suitable elasticity.

Joints capable of having these characteristics may be cited, by way of example, as those with densified carbon and joints with a metal torus with a built-in spring.

According to a second embodiment of the device, the base can comprise two parts, a first part with an alloy the composition of which is substantially that of the tube and which encloses said tubes, and a second metal part which encloses the first part and which is formed from one single metal such as nickel, copper or iron or which is formed of an alloy of a composition which differs from that of the alloy forming the first part, Said parts of the base adhere to one another in substantially seal-tight manner, such as by means of a glue such as cited hereinabove or by means of brazing, the fusion temperature of which is lower than that of the metal pieces which are to be assembled. Excellent results have been achieved by brazing.

Moreover, the base can be fixed to the casing in substantially seal-tight manner by soldering, brazing or any other suitable fixing system such as a clamp.

Usually, the tubes and the base (the first part or the entire base) are made of an alloy containing 45 to 95% by weight palladium, advantageously 65 to 90% and preferably 70 to 80%.

This alloy can comprise at least one metal selected from the group formed of Ag, Sn, Sb, Ce, Ru, Rh, Cu, Au and Y. Preferably, silver is used in a proportion of 20 to 30% by weight. However, it is also possible to use a binary alloy such as Pd-Ce:92.3-7.7 or Pd-Au: 90-10%.

If at least two metals are associated with the palladium to constitute the alloy, the silver advantageously makes up the major part of the two metals.

The ternary alloys can be cited as follows, by way of example:

| Pd—Ag—Ni | 85-13-2(%) |
| Pd—Ag—Rh | 70-20-10 |
| Pd—Ag—Au | 73-24-3 |

The quaternary alloys can be cited as follows, by way of example:

| Pd—Ag—Au—Ru | 73,74-20-5-1.26(%) |
| Pd—Ag—Au Ru | 68-25-5-2 |

Particularly with a Pd/Ag alloy containing 74 to 79% by weight inclusive palladium, no phase change is observed when fluctuations in temperature occur with varying hydrogen pressures (0.1 to 50 bars absolute, for example).

BRIEF DESCRIPTION OF DRAWINGS

The invention will be better understood in the light of the drawings which illustrate the device in non-limitative manner, and wherein:

FIG. 1 shows a longitudinal sectional view through a purifying device for hydrogen;

FIG. 2 shows a method of fixing the base, the base containing a plurality of diffusion tubes;

FIG. 3 illustrates another embodiment of the base according to the invention.

DETAILED DESCRIPTION OF DRAWINGS

According to FIG. 1, a purifying device for hydrogen (1) comprises an outer casing (2) which is cylindrical in shape, for example, and which contains a plurality of diffusion tubes (3) which can be made of an alloy of 77% palladium and 23% silver. The tubes are closed at one end (4) and open at the other end (5). They may be 140 cm in length, for example, and 2 mm in diameter, and 60 to 150 micrometers in thickness. The tubes are mounted in parallel relationship, with the open end on a metal disc (6) or punctured base made of an appropriate alloy which defines a chamber in which the hydrogen is purified. The casing (2) comprises an intake (7) for a gaseous mixture containing the hydrogen to be purified, the intake being connected to one end of the chamber, at the closed end side of the tubes and a first outlet opening (8) collecting the pollutants of the gaseous mixture disposed in the vicinity of the base at the opposite end of the chamber.

Once the purified hydrogen has diffused through the wall of the tubes and penetrated inside them, it issues through the open end and is recovered through a second outlet opening (9) connected to the closure cover of the casing. The Pd/Ag metal tubes are soldered by laser beam, plasma micro-blowpipe, electric solder or any other method of autogenous soldering: to the metal base (6) of Pd/Ag (77/23) alloy or of any other metals of a composition such that the expansion coefficient in hydrogen is as close as possible to that of the alloy of the tube. The metal base shown in FIG. 2 which can be 0.1 to 15 mm in thickness can be mounted in substantially seal-tight manner between the casing and the head of the purifying device by virtue of joints (10) of densified carbon which are arranged on either side of the base, and which provide a sealing relative to the outside by virtue of a system (12) of clamps (11) and clamping pins. A reinforcing member (13) holds the base in place, on which base the Pd/Ag tubes are soldered in seal-tight manner, and permits resistance, particularly to forces applied by the internal pressure of the hydrogen which can reach 40 bar, preferably 20 to 25 bar.

According to another embodiment, illustrated in FIG. 3, the metal base (6) is made of nickel, stainless steel or any other metal material, and is soldered in substantially seal-tight manner to the casing. At the level of the base, a ring (14) which embraces the end of the Pd/Ag (77/23) alloy tubes and which has an expansion coefficient in hydrogen which is close to that of the alloy of the tube adheres by way of an autogenous soldering (15), produced by a laser beam or any other means of autogenous soldering, to the open end of the tube. Its internal diameter is such that it allows a tube to pass therethrough. Its external diameter is usually greater than the internal diameter by about 0.2 to 15 mm, for example. The height of the ring (14) is usually at the most equal to the thickness of the base. Most frequently it is desirable to have the maximum possible number of tubes (3), and it is then recommended that the rings (14) be at least equal in height to half the thickness of the base, in such a way as to obtain an arrangement such as illustrated in FIG. 3. Preferably, the height of the ring (14) embracing each tube (3) is about 5% to about 45%, and more preferably about 10% to about 40% the thickness of the base. The two parts of the base of different composition embrace the tubes and usually adhere by means of a brazing (16) which is preferably formed at the level of the part which is furthest away from the diffuser tube.

The tube which is fixed thus undergoes virtually no change in respect of its composition during its manufacture and when placed in hydrogen, and neither is it subject to a change of phase. Finally, it is only subject to a minimum amount of stress caused by expansion differences since it is placed in a ring of substantially the same expansion coefficient as itself.

We claim:

1. A device for separating hydrogen in gaseous mixtures or for purifying gaseous hydrogen, comprising an outer casing (2) enclosing at least one tube (3) made of a hydrogen-permeable palladium base alloy, wherein at least one of the ends of the at least one tube (3) is fixed in a substantially sealtight manner to a part, at least, of a base (6) having at least one hole therein for enclosing said at least one end, said base being made of a metal alloy of a composition such that said metal alloy has an expansion coefficient in hydrogen substantially equal to that of the palladium-based alloy of the tube, said fixed tube having an external diameter less than the internal diameter of said at least one hole.

2. A device according to claim 1, comprising a plurality of tubes, wherein the base is made up of one single part which is substantially identical in composition to that of the alloy used to form the tubes, said tubes adhering to said base in a substantially sealtight manner.

3. A device according to claim 1, wherein the base comprises two parts, a first part (14) which is of substantially the same composition as said at least one tube and which encloses said at least one tube, and a second part which is metal or formed from a second alloy of different composition from that of the alloy forming the first part, said parts of the base adhering to one another in a substantially sealtight manner.

4. A device according to claim 3, wherein the two parts of the base adhere by brazing (16).

5. A device according to claim 3, wherein the base comprises at least one reinforcing member (13) which keeps it in the casing.

6. A device according to claim 1, wherein said at least one tube adheres to said base or part of the base by way of an autogenous soldering.

7. A device according to claim 1, wherein the base is fixed to the casing (2) in a substantially sealtight manner by at least one clamp (11) which grips at least one joint (10) of suitable composition.

8. A device according to claim 1, wherein the base is fixed to the casing (2) in a substantially sealtight manner by a soldering, brazing or any suitable fixing system.

9. A device according to claim 1, wherein said at least one tube (3) and part of the base or the base as a whole are made of an alloy containing 45 to 95% by weight palladium.

10. A device according to claim 9, wherein said alloy contains 65-90% palladium.

11. A device according to claim 9, wherein said alloy contains 70-80% palladium.

12. A device according to claim 9, wherein said alloy contains 74-79% palladium.

13. A device according to claim 12, wherein said palladium-based alloy comprises silver.

14. A device according to claim 9, wherein said palladium-based alloy comprises silver.

15. A device according claim 1, wherein said palladium based alloy comprises at least one metal selected from the group consisting of Ag, Sn, Sb, Ce, Ru, Rh, Cu, Au and Y.

16. A device according to claim 1, wherein the alloy comprises palladium and 20 to 30% silver.

17. A device according to claim 1, wherein said at least one tube contains at least one stiffening element to maintain the lateral rigidity under the temperature and pressure conditions to which the tubes are subjected.

18. A device according to claim 1, wherein said palladium-based alloy comprises silver.

19. A device according to claim 1, wherein said at least one tube having at least one end fixed in a substantially sealtight manner to a part, at least, of said base, is open-ended at said base and extends beyond said base.

20. A device for separating hydrogen and gaseous mixtures or for purifying gaseous hydrogen, comprising an outer casing (2) enclosing at least one tube (3) made of an appropriate palladium-based alloy, wherein at least one of the ends of the at least one tube (3) is fixed in a substantially sealtight manner to a part, at least, of a base (6) made of a metal alloy having a composition such that said metal alloy has an expansion coefficient in hydrogen substantially equal to that of the palladium-based alloy of the tube and wherein the base comprises two parts, a first part (14), which is of substantially the same composition as said at least one tube and which encloses said at least one tube, and a second part, which is metal or formed from a second alloy of different composition from that of the alloy forming the first part, said parts of the base adhering to one another in a substantially sealtight manner.

21. A device according to claim 20, wherein the two parts of the base adhere by brazing (16).

22. A device according to claim 20, wherein the base comprises at least one reinforcing member (13) which keeps it in the casing.

* * * * *